(12) United States Patent
Sowers

(10) Patent No.: US 6,651,414 B1
(45) Date of Patent: Nov. 25, 2003

(54) GRASS AND LEAF COLLECTION SLED FOR RIDING LAWN APPARATUS

(76) Inventor: Mark Sowers, 2040 Chartstone Dr., Midlothian, VA (US) 23113

( * ) Notice: Subject to any disclaimer, the term of this patent is extended or adjusted under 35 U.S.C. 154(b) by 0 days.

(21) Appl. No.: 09/897,303

(22) Filed: Jul. 2, 2001

(51) Int. Cl.$^7$ ............................................... A01D 19/00
(52) U.S. Cl. ............................ 56/16.8; 56/194; 56/199
(58) Field of Search ...................... 56/16.6, 202, 194, 56/199; 280/19

(56) References Cited

U.S. PATENT DOCUMENTS

| | | | | |
|---|---|---|---|---|
| 2,970,422 A | * | 2/1961 | Kroll et al. | 56/202 |
| RE24,955 E | * | 3/1961 | Campbell | 56/202 |
| 3,355,187 A | * | 11/1967 | Brindle | 280/19 |
| 3,527,037 A | * | 9/1970 | Leader | 56/202 |
| 3,881,304 A | * | 5/1975 | Lempke | 37/243 |
| 4,046,393 A | * | 9/1977 | Vadnais | 280/19 |
| 4,173,351 A | * | 11/1979 | Hetland | 280/18 |
| 4,532,755 A | * | 8/1985 | Schemelin et al. | 56/16.6 |
| 4,986,062 A | * | 1/1991 | Hill | 56/16.9 |
| 5,070,687 A | * | 12/1991 | Schweigert | 298/6 |
| 5,104,133 A | * | 4/1992 | Reiner | 280/19 |
| 5,125,222 A | * | 6/1992 | Speier | 56/13.3 |
| 5,529,321 A | * | 6/1996 | Thompson | 280/19 |
| 5,546,738 A | * | 8/1996 | Turner | 56/16.6 |
| 5,660,402 A | * | 8/1997 | Jones et al. | 280/19 |

\* cited by examiner

*Primary Examiner*—Árpád F+e Kovács

(57) ABSTRACT

A grass and leaf collection sled for riding lawn mowers. The sled vastly increases the total volume of grass, leaves, and other lawn residue that can be picked up and transported to a disposal site. The sled is easily assembled, simple to load and unload, and is easily stored after use. The sled enables collection of a large volume of lawn refuse without relying upon additional mechanical devices to complicate the operation of the lawnmower.

8 Claims, 6 Drawing Sheets

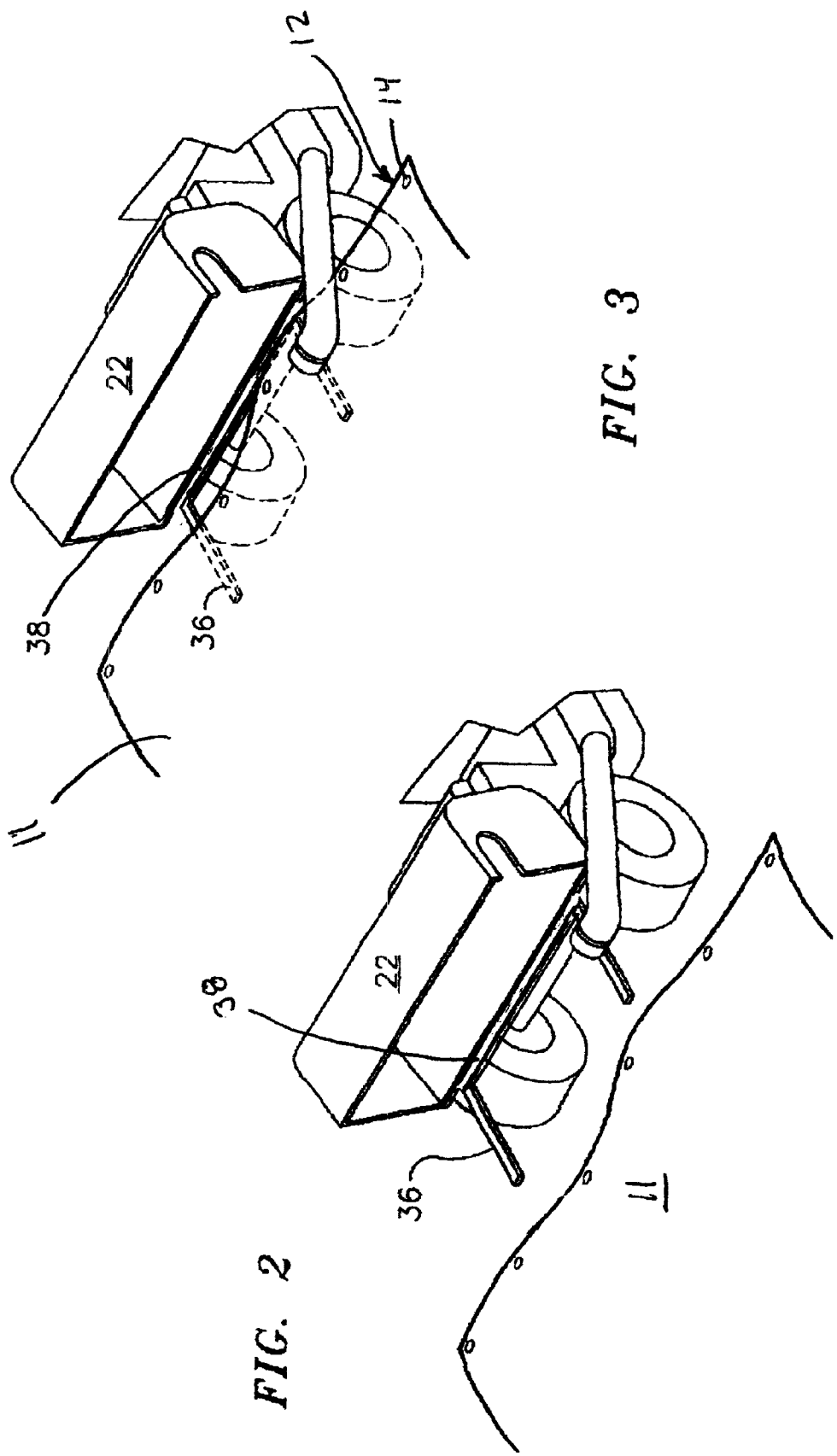

GRASS AND LEAF COLLECTION SLED FOR RIDING LAWN APPARATUS

FIELD OF THE INVENTION

This invention relates to grass and leaf collection mechanisms for riding lawn mowers and specifically to an improved grass and leaf collection device that greatly increases the volume of grass, leaves, and other lawn residue that can be picked up and transported, is easily unloaded, and is easily stored after use.

BACKGROUND OF THE INVENTION

It is common to equip riding lawn mowers with bagging devices for collection of grass cuttings, leaves, and other lawn refuse. Typically, the mower blade or a supplemental blower or fan create a vacuum that sucks up lawn debris and transports it through a conduit and into one or more collection bags. The practical size of the collection bags is limited as the bags typically hang in a framework integral with the mower, and the framework must therefore support the collection bags plus the weight of the collected yard refuse. As the bags are therefore limited in size, they are of limited use when grass cuttings are heavy or when the mower is used to remove fallen leaves from the lawn. In this situation, the typical collection bags are woefully inadequate and a better system is needed to remove the large volume of refuse from the lawn.

One method of improving the collection of lawn refuse is given in U.S. Pat. No. 5,020,309 to Hopkins issued Jun. 4, 1991. This patent describes a shredder attachment for use with lawn machines having vacuum or fan movement of shreddable material. The shredder mechanism reduces the volume of leaves or grass clippings but only incrementally increases the volume of lawn refuse that can be collected. The total collection capacity remains limited by the fixed size of the collection bags. The shredder also adds another mechanical device to the mower that increases the mower's complexity and adds to its maintenance requirements. The shredder and typical devices also increase the resistance to refuse conveyance and raise the back pressure on the attached conveying tubing. In addition, branches are typically sucked up by mower systems, and the shredder blade increases the possibility of those branches becoming jammed in the shredder blades, especially if the branches are of too large a diameter to be shredded by the shredder blade and its motor.

Although the aforementioned patent discloses a method for reducing the volume of grass clippings and leaves, it does not adequately solve the limited storage capacity of mower collection bags. In times when grass is tall and thick, or when collecting leaves, the collection capacity of typical riding lawn mowers is woefully inadequate.

It is therefore an objective of the present invention to greatly increase the storage capacity of grass and leaf collection devices.

A second objective of the present invention is to greatly increase the storage capacity of grass and leaf collection devices without adding to the mechanical complexity of the mower.

It is another objective to greatly increase the storage capacity of grass and leaf collection devices without adding mechanical devices that increase the possibility of branches or other oversize items becoming jammed in the conveying passageways of the mower.

It is another objective to reduce the resistance to pick up of bulky yard refuse by providing a refuse collector that creates minimal back pressure on the refuse conveying tube.

SUMMARY OF THE INVENTION

The aforementioned problems are overcome by providing a grass and leaf collection sled for a riding lawn mower.

In accordance with the preferred embodiment of the invention, the hinged hood of a typical riding lawn mower discharge chute is lifted and a sheet is laid with its forward edge placed forward of the bag support. The hinged hood is swung down and locked in place thereby clasping the sheet between the hood and the forward rim of the bag support. The remaining forward edge of the sheet is then wrapped around the outside perimeter of the hood and secured to the hood by a bungee cord or similar means. The sheet is sized such that it overlaps the hood at its secured side and trails well behind the riding lawnmower at its free end. The overlap extends from the hood and thence rearwards essentially to the free rearward end of the sheet. Secured to the riding lawn mower in this manner, the sheet becomes an extended, large capacity sled for collection of grass clippings, leaves, and other lawn refuse. The sled is light and can easily be pulled across the lawn by the riding mower. The sled, secured at its forward end between the hood and the forward rim of the bag support, essentially creates a funnel-shaped discharge chute for depositing refuse on the trailing portion of the sled that contacts the ground.

In this manner, the sled greatly increases storage capacity and does so without the addition of complex mechanical devices that can increase air resistance and create jams by trapping branches and other oversize objects.

These and other advantages will become apparent when reading the attached detailed description of the invention while referring to the attached drawings and the appended claims.

BRIEF DESCRIPTION OF THE DRAWINGS

FIG. 2 is a perspective view of a hood and bag support

FIG. 3 is a perspective view of the sled in an intermediate state of assembly showing the sheet positioned between the hood and bag support.

TABLE OF NOMENCLATURE

The following table lists the nomenclature identifying the parts in the attached drawings and detailed description:

| Part Number | Part Description |
| --- | --- |
| 10 | sled |
| 11 | sheet |
| 12 | leading end (of sled) |
| 13 | trailing end (of sled) |
| 14 | grommet |

-continued

| Part Number | Part Description |
| --- | --- |
| 16 | expandable cord |
| 18 | riding lawn mower |
| 20 | conduit |
| 22 | hood |
| 24 | overlap |
| 26 | connection point (of cords) |
| 28 | discharge funnel |
| 30 | elongated refuse bed |
| 32 | lawn refuse |
| 34 | folded sled |
| 36 | bag support |
| 38 | pinch point |
| 40 | inside wall (of sled) |
| 42 | propulsion device |
| 44 | seat |
| 46 | pickup device |

DETAILED DESCRIPTION OF THE INVENTION

Figure 1:
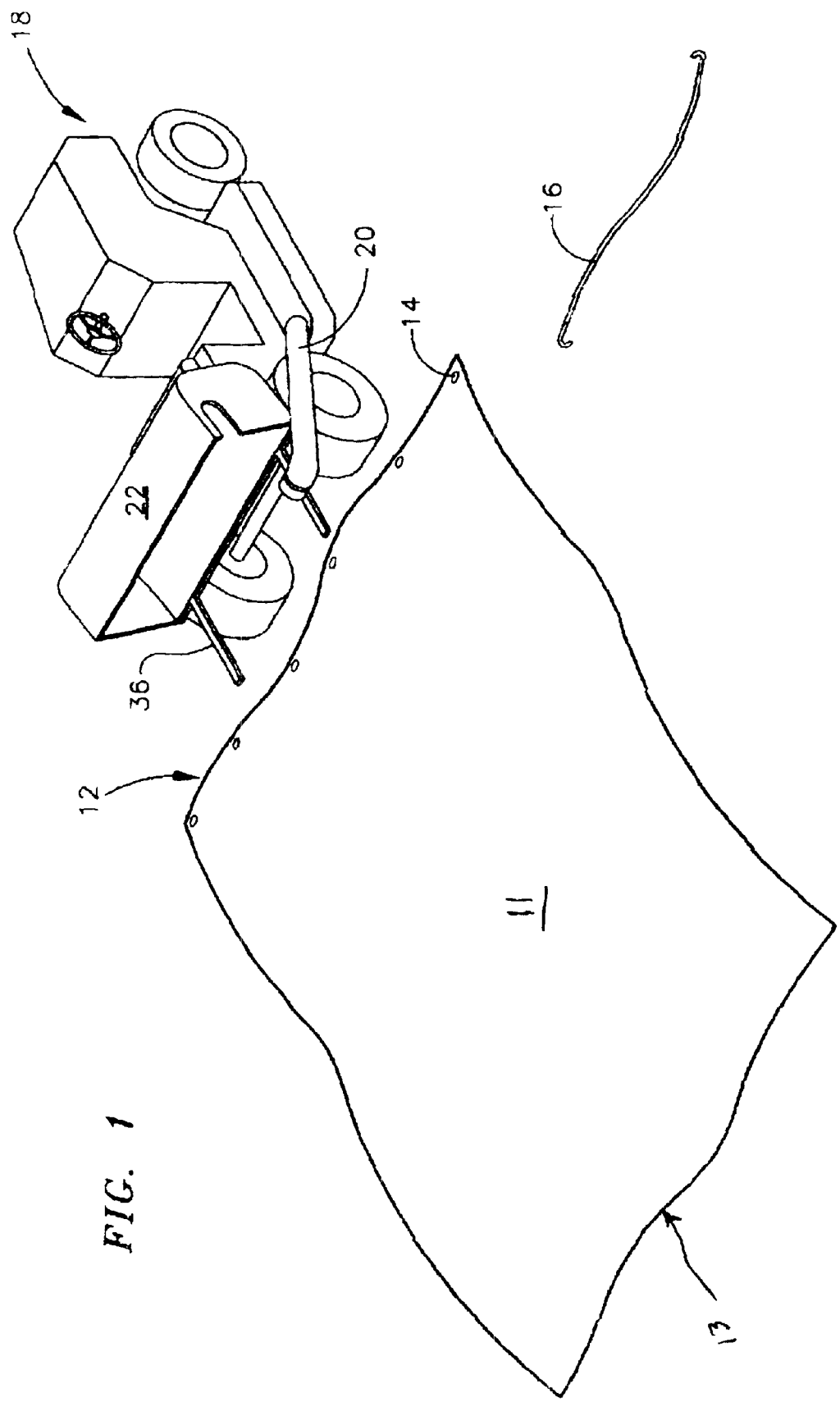
FIG. 1 is a perspective view of a sheet modified for use as a sled of this disclosure, an expandable cord, and a riding lawnmower.

The present invention, a grass and leaf collection sled for a riding lawnmower, is depicted prior to assembly in FIG. 1. The perspective view of FIG. 1 depicts a sheet 11 including a row of grommets 14 spaced along the leading end 12. For purposes of defining the invention this end 12 may be referred to as the leading end 12 with the opposite edge defined as the trailing end 13. FIG. 1 includes an expandable cord 16 with two hooked ends and a riding lawnmower 18 having a discharge conduit 20, a discharge hood 22, and bag supports 36. The riding lawnmower 18 is of the type that creates a vacuum by either the rotating cutting blade or by means of a separate rotating fan. The vacuum creates suction within the mower blade housing and conveys grass clippings, leaves, small branches, and similar lawn refuse into collection bags (not shown in FIG. 1) that are typically laid upon the bag supports 36.

FIG. 2 is a perspective view showing the hood 22 and bag support 36 of the riding lawnmower of FIG. 1. The hoods 22 on riding lawnmowers that feature vacuum collection of lawn refuse typically are hinged (not shown in FIG. 2) to the bag support 36 framework. The space between the hood 22 and bag support 36 framework creates a pinch point 38 that may be used for securing a flexible sheet.

A perspective view of the sled in an intermediate state of assembly is given in FIG. 3. The leading end 12 of the sheet 11 is positioned in the pinch point 38 that is between the hood 22 and bag support 36. The expandable cord (not shown in FIG. 3) is threaded in an undulating manner through the grommets 14 along the leading end 12 of the sheet 11. When the hood 22 is closed, the leading end 12 of the sheet 11 will be secured between the hood 22 and the bag support 36.

Figure 4:
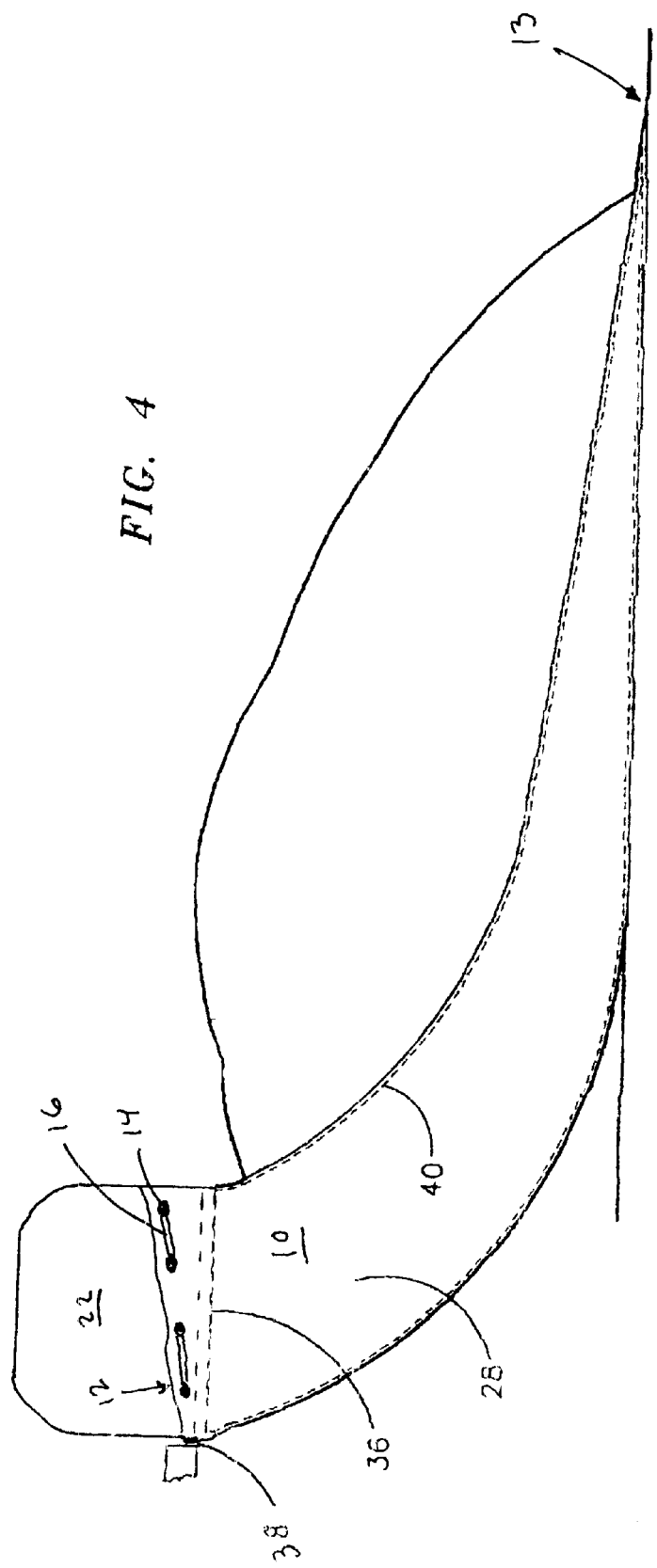
FIG. 4 is a side elevation view emphasizing the discharge funnel created by attaching the sled to the hood.

The assembled sled 10 is depicted in FIG. 4 and shows the discharge funnel 28 created by attaching the sheet to the hood 22. The discharge funnel 28 is defined by the inner surface 40 of the sled 10 in FIG. 4. Securing the leading end 12 of the sheet 11 in the pinch point 38 and wrapping the remainder of the leading end 12 around the outer perimeter of the hood 22 forms the discharge funnel 28. The expandable cord 16 secures the sheet 11 to the perimeter of the hood 22 opposite the pinch point 38. The trailing end 13 of the sheet is allowed to trail upon the ground behind the discharge hood 22.

Figure 5:
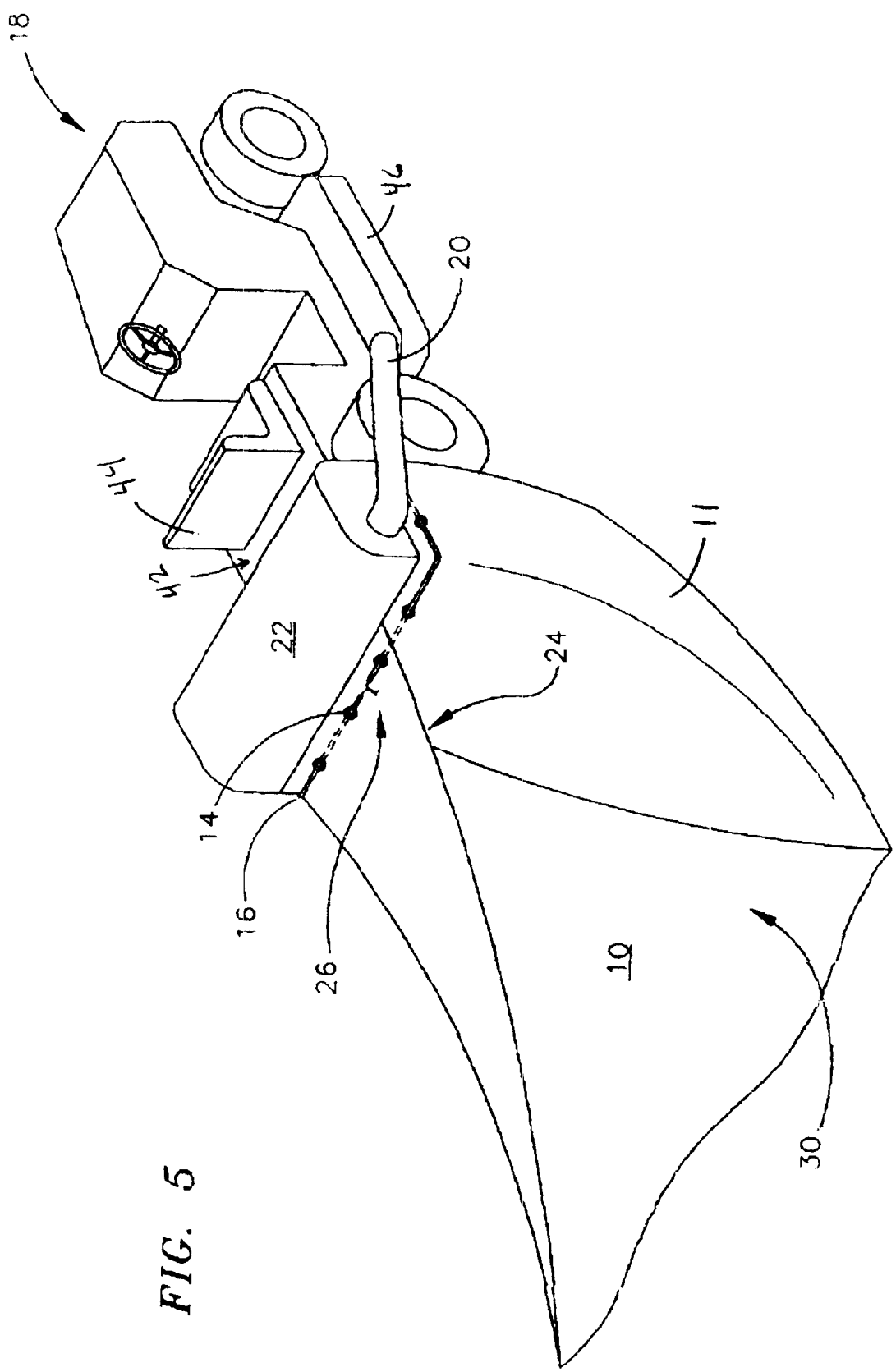
FIG. 5 is a perspective view of preferred embodiment of the grass and leaf collection sled attached to a riding lawn mower.

A perspective view of the preferred embodiment of the grass and leaf collection sled 10 is depicted in FIG. 5. The sled 10 is connected to a riding lawn apparatus that includes a propulsion device 42, a seat 44, and a pickup device 46 for picking up grass clippings and leaves and conveying through a conduit 20 to a discharge hood 22. As shown in FIG. 5, the sheet 11 is overlapped 24 and then secured to the hood 22 by the expandable cord 16. The connection point 26 of the expandable cord 16 is typically at the overlap 24 of the sheet 11. The expandable cord 16 is typically threaded through the grommets 14 as shown in FIG. 5. Fully assembled, the sled 10 forms an elongated, refuse bed 30 that greatly expands the capacity for yard refuse over the collection bags typical of mowers employing vacuum collection systems.

Figure 6:
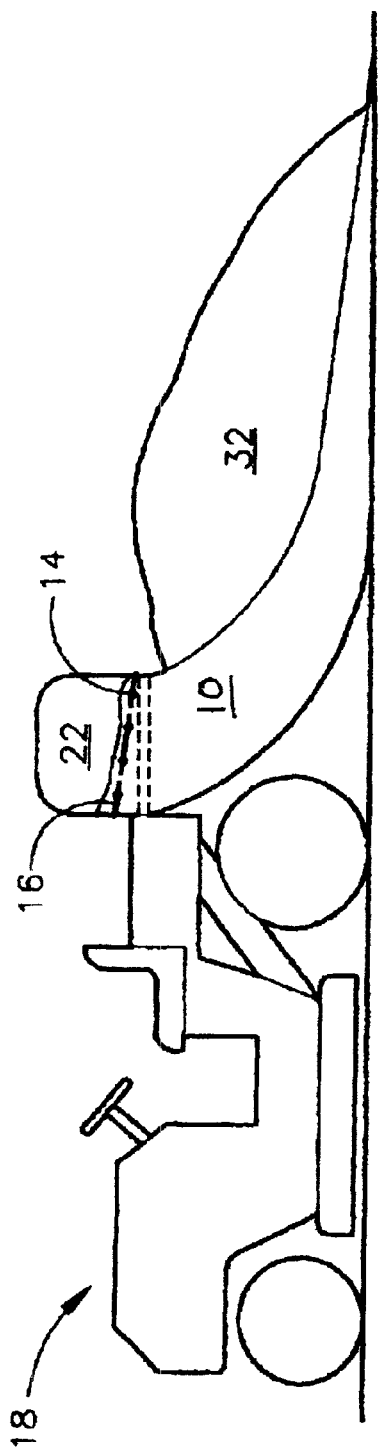
FIG. 6 is a side view of the sled and riding lawnmower and depicting the sled in a loaded condition.

A grass and leaf collection sled 10 is depicted in a loaded condition in FIG. 6. The sled 10 with collected lawn refuse 32 is shown attached to a riding lawnmower 18. As the lawnmower travels in a straight path, the sled 10 trails in a straight path behind the mower. As trees or other obstructions are encountered in the path of the mower, the sled turns with the mower to avoid the obstructions. The time required for cleaning a lawn is greatly reduced by the large capacity of the sled. Anyone who has operated a riding lawnmower employing vacuum collection of yard refuse knows that the clean up time is greatly increased by the necessity of emptying the collection bags. The bags are very small when compared to the bulky volume of yard refuse. Yard refuse builds very quickly when the grass is tall or thick and also during the fall when leaves accumulate rapidly. Under these conditions, the operator is forced to empty the bags often and repeatedly. The time is compounded by the fact that most operators drive the mower to a disposal site for the waste. These repeated trips to the disposal site greatly increase the time required to clean a lawn. The grass and leaf collection sled of this disclosure greatly reduces the operating time for cleaning a lawn.

Another feature of the grass and leaf collection sled is the ease of unloading the refuse. After the loaded sled is pulled to the disposal point, the sled is simply lifted from one side thereby allowing the refuse to fall out the opposite side. There is no need to disconnect the sled from the discharge hood to dump the refuse. This is another time saving feature of the sled over conventional refuse collection bags. Typically two storage bags are used with a riding lawn mower, and when emptying them, each of the bags would need to be emptied individually. This would involve lifting the discharge hood, picking up one storage bag, dumping out the accumulated refuse, returning the emptied bag to its bag support, picking up the second storage bag, dumping out the accumulated refuse, and returning the second emptied bag to its bag support. Emptying the bags therefore is more time consuming and complex than emptying the sled.

Figure 7:
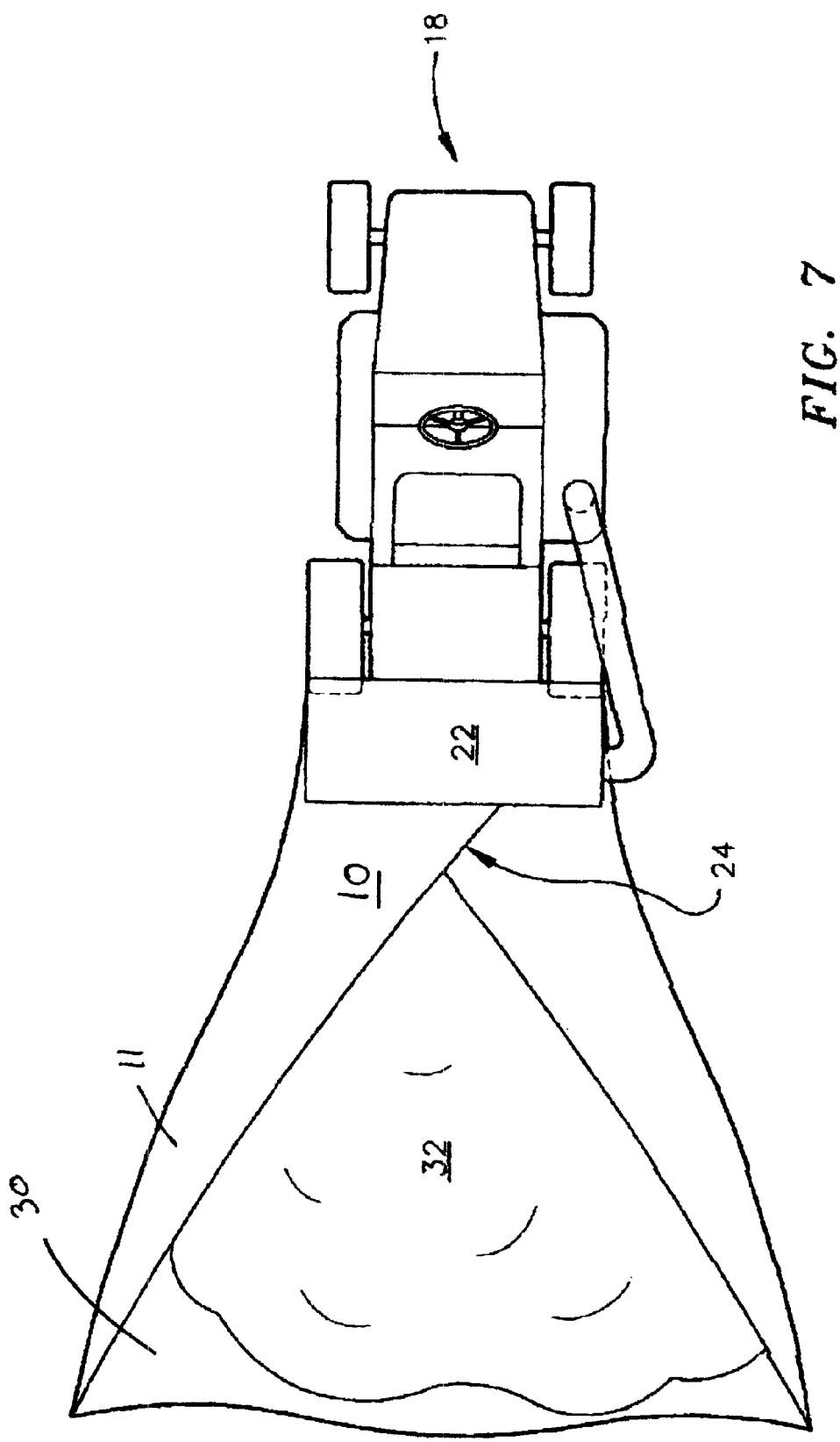
FIG. 7 is an overhead view of the loaded sled affixed to a riding lawnmower.

FIG. 7, an overhead view of the loaded sled 10 affixed to a riding lawnmower 18, depicts the sled 10 with lawn refuse 32 accumulated on the elongated refuse bed 30. The sheet 11 is overlapped 24 at its connection with the hood 22. Lawn refuse is transported by the vacuum through the hood 22 and into the elongated refuse bed 30 of the sled 10. The configuration of the sled 10 around its juncture with the hood 22 creates a discharge funnel (not shown in FIG. 7) that funnels the lawn refuse onto the refuse bed 30. The outer spread of the sled 10 can expand as waste is accumulated, thereby allowing the sled to adjust for increasing quantities of waste.

Figure 8:
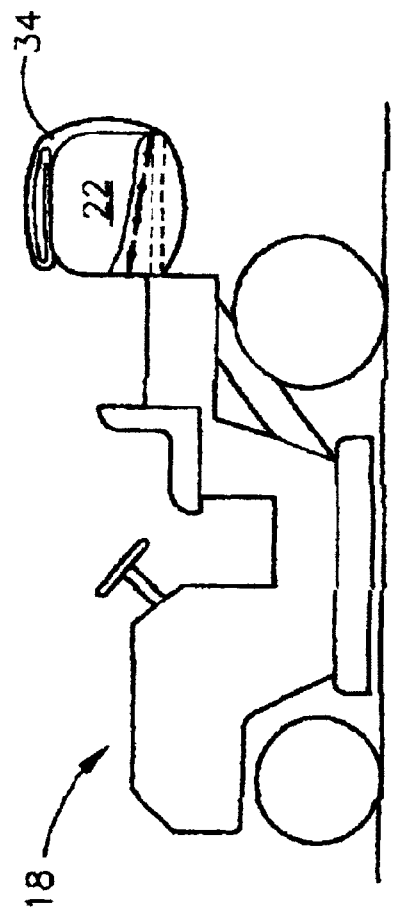
FIG. 8 is a side view showing the sled folded and wrapped around the hood for storage.

An added feature of the sled is the fact that it is easily stored with the riding lawnmower. FIG. 8 is a side view showing the sled folded and wrapped around the hood 22 for storage. The folded sled 34 may be secured to the hood with a bungee cord (not shown in FIG. 8) or similar device. The bungee cord may be secured at either end to the hood 22 or the sled may be provided with an additional grommet (not shown in FIG. 8) to assist with securing the folded sled 34.

The sled is typically constructed of a flexible material such as polyvinyl chloride, polyethylene, polypropylene, rip-stop nylon, fabric, or any similar flexible material. The sled should be flexible to allow it to easily turn with and follow the riding mower around the yard. Any flexible plastic material may be reinforced with fibers to strengthen the sled and help it resist abrasion. Other properties that would desirable in selecting the material of construction would include water resistance and coefficient of friction. High water resistance would be preferable for the sled to minimize water pickup by the sled, which would add undesirably to the weight of the load. A low coefficient of friction between the lower surface of the sled and the ground would enable easy travel of the sled over the ground.

Referring to FIG. 1, the preferred size of the sled 10 is 12 feet width by 16 feet length, with the width denoted by w in the drawing and the length denoted by 1 in the drawing. As shown in FIG. 5, the sled 10 must be wide enough to span the perimeter of the discharge hood 22 and overlap 24 itself at the connection point 26 to the discharge hood 22. The length of the sled 10 must be sufficient to keep the collected lawn refuse from blowing off the end of the elongated refuse bed 30. Typically, as discharge hoods are of different sizes for various models of riding lawn mowers, the optimum width of the sled would vary, but typically the width would be between 8 and 16 feet. The length of the sled would be specified according to the user's preference, with a longer sled forming a longer refuse bed. Typically, the sled would vary between 10 and 22 feet depending on the user's preference.

Some riding lawnmowers include bag supports that extend horizontally rearward below the middle portion of the hood. For this special situation, a second embodiment of the sled is provided. Wrapping the sheet around the outer bag support frame to create a discharge funnel forms this embodiment. In this situation, the forward edge of the sheet is not pinched between the hood and bag support but is wrapped completely around the hood and secured to the perimeter of the hood with the expandable cord. Secured in this manner, the second embodiment of the grass and leaf collection sled operates in the same manner as the preferred embodiment.

Some examples of the present invention have been described in detail in this specification. It will become apparent to those skilled in the art that the present invention may be altered in many ways without departing from the spirit and scope of the invention. Thus the scope of the invention should be determined by the appended claims and their legal equivalents, rather than by the examples given.

What is claimed is:

1. A riding lawn apparatus comprising:
   a propelled vehicle;
   a seat;
   a pickup arrangement for picking up lawn refuse;
   a discharge hood;
   a conduit for conveying the lawn refuse from said pickup arrangement to said discharge hood;
   a sheet having a first end and a trailing end;
   said first end positioned around the outer perimeter of said discharge hood to form a discharge funnel below said discharge hood;
   said trailing end contacting and spreading over the ground to form a refuse bed integral with said discharge funnel; and
   a connection arrangement for securing said sheet around the periphery of said discharge hood.

2. The riding lawn apparatus of claim 1 wherein:
   said lawn apparatus includes a bag support framework;
   said sheet includes a plurality of grommets adjacent said first end;
   said grommets include an expandable cord having hooked ends and undulating through said grommets; and
   said connection arrangement closes a portion of said first end of said sheet between said discharge hood and said bag support framework with the remaining portion of said first end secured around said discharge hood by connecting said hooked ends of said expandable cord.

3. The riding lawn apparatus of claim 1 wherein:
   said sheet includes a plurality of grommets adjacent said first end;
   said grommets include an expandable cord having hooked ends and undulating through said grommets; and
   said connection device includes securing said first end around said discharge hood by connecting said hooked ends of said expandable cord.

4. The riding lawn apparatus of claim 1 wherein said sheet is constructed of a flexible material such as polyvinyl chloride, polyethylene, polypropylene, or rip-stop nylon.

5. A sled for attachment to a riding lawn apparatus comprising:
   a sheet having a leading end and a trailing end;
   said leading end of said sheet positioned around the outer perimeter of a discharge hood of a lawn mower to form a discharge funnel;
   said trailing end of said sheet resting on the ground and spreading over the ground to form a refuse bed integral with said discharge funnel; and
   a connection arrangement for securing said sheet to said riding lawn apparatus.

6. The sled of claim 5 wherein said connection arrangement includes:
   a plurality of grommets adjacent said leading end;
   an expandable cord having hooked ends and undulating through said grommets whereby said hooked ends are adapted to connect to the opposite ends of said leading end of said sheet.

7. The sled of claim 5 wherein said sheet is constructed of a flexible material such as polyvinyl chloride, polyethylene, polypropylene, or rip-stop nylon.

8. A method of forming a lawn refuse collection sled and riding lawn apparatus including:
   providing a flexible sheet having a first edge and a second edge opposite said first edge;
   providing grommets along said first edge of said sheet;
   providing an expandable cord having a hook at each end;
   threading said expandable cord through said grommets in an undulating manner;
   providing a riding lawn apparatus including a refuse pick up and conveying mechanism that conveys refuse to a discharge hood;
   opening the discharge hood of said riding lawn apparatus;
   removing the refuse collection bags from the bag support of said riding lawn apparatus;
   placing said first edge of said sheet between said open discharge hood and said bag support;
   closing said discharge hood upon said bag support;
   forming a discharge funnel by wrapping the remainder of said first edge of said sheet around said discharge hood;
   securing said sheet to said discharge hood by tensioning said expandable cord around said first edge and connecting said hooks; and
   forming a refuse bed integral with said discharge funnel by spreading said second edge of said sheet along the ground behind said riding lawn apparatus.

\* \* \* \* \*